United States Patent [19]

Sliwka

[11] 4,406,816

[45] Sep. 27, 1983

[54] PROCESS FOR THE PREPARATION OF MICROCAPSULES, AND THE MICROCAPSULES OBTAINED THEREBY

[75] Inventor: Wolfgang Sliwka, Weinheim, Fed. Rep. of Germany

[73] Assignee: BASF Aktiengesellschaft, Rheinland-Pfalz, Fed. Rep. of Germany

[21] Appl. No.: 192,473

[22] Filed: Sep. 30, 1980

[30] Foreign Application Priority Data

Oct. 8, 1979 [DE] Fed. Rep. of Germany ....... 2940786

[51] Int. Cl.$^3$ ............................................. B01J 13/02
[52] U.S. Cl. ..................................... 521/69; 71/DIG. 1; 106/308 M; 106/308 N; 252/522 A; 282/27.5; 264/4.33; 264/4.7; 424/32; 427/213.31; 427/213.34; 424/248.4; 426/89; 426/650; 428/320.6; 428/320.8; 428/914; 521/187; 521/74
[58] Field of Search ..................... 252/316; 428/320.6; 521/187

[56] References Cited

U.S. PATENT DOCUMENTS

| | | | |
|---|---|---|---|
| 3,016,308 | 1/1962 | Macaulay | 252/316 X |
| 3,872,023 | 3/1975 | Baum et al. | 252/316 |
| 3,939,095 | 2/1976 | Sliwka et al. | 252/316 |
| 4,001,140 | 1/1977 | Foris et al. | 252/316 |
| 4,100,103 | 7/1978 | Foris et al. | 252/316 |
| 4,105,823 | 8/1978 | Hasler et al. | 252/316 X |

FOREIGN PATENT DOCUMENTS

| | | | |
|---|---|---|---|
| 742643 | 9/1966 | Canada | 252/316 |
| 2538015 | 3/1977 | Fed. Rep. of Germany | 252/316 |
| 1221489 | 2/1971 | United Kingdom | 252/316 |
| 1540986 | 2/1979 | United Kingdom | 252/316 |

*Primary Examiner*—Richard D. Lovering
*Attorney, Agent, or Firm*—Oblon, Fisher, Spivak, McClelland & Maier

[57] ABSTRACT

In a process for the preparation of microcapsules based on a melamine-formaldehyde resin, in which the microcapsules are obtained by condensing a melamine-formaldehyde precondensate, its $C_1$–$C_4$-alkyl ethers, or mixtures thereof, in water in which the material forming the capsule core is dispersed, at a pH of from 3 to 6.5 and at from 20° to 100° C., the improvement that the water contains a homopolymer or copolymer which possesses sulfonic acid groups but is devoid of phenyl or sulfophenyl groups and has a K value of from 100 to 170 or a viscosity of from 200 to 5,000 mPa.s (shearing gradient 489 s$^{-1}$; 20% strength solution at 25° C.), and that the melamine-formaldehyde precondensate is added continuously, or in portions, in step with the rate of condensation.

The process gives individual capsules which are highly impermeable. The capsules are exceptionally useful for the production of pressure-sensitive recording materials.

12 Claims, No Drawings

PROCESS FOR THE PREPARATION OF MICROCAPSULES, AND THE MICROCAPSULES OBTAINED THEREBY

The present invention relates to a process for the preparation of microcapsules based on a melamineformaldehyde resin, to the microcapsules obtained by this process and to their use in pressure-sensitive recording systems.

Microcapsules whose walls consist of polycondensates based on urea, phenol or melamine and formaldehyde have been known from the patent literature for some time.

U.S. Pat. No. 3,016,308, for example, states that suitable wall materials include, amongst many other resins, melamine resins produced, for example, from melamine and formaldehyde, or urea resins, for example urea-formaldehyde resins. According to Example IV of the U.S. Patent, the wall material is formed from the components in a solution having a high hydrochloric acid content, in the presence of carboxymethylcellulose, which has a very low viscosity. Because of the very low pH of the aqueous continuous phase, this process is unsuitable for the preparation of microcapsules containing dye-forming components, since the latter react with the acid during the dispersion process, to form the dye. The process has the further disadvantage that microcapsules having a broad particle size spectrum, of from 4 to 50 μm, are formed.

Canadian Pat. No. 742,643 describes microcapsules wherein the wall material consists of urea-formaldehyde condensates and urea-melamine-formaldehyde condensates. The wall material is obtained by in situ condensation of urea and formaldehyde, with or without melamine, in the aqueous phase, or of water-soluble, low molecular weight prepolymers, in the aqueous phase, in the absence of further agents. To obtain very small capsules, the condensation must be carried out very slowly, so that the dispersion does not gel or become thick and viscous. The latter requirement also means that the concentration of dispersed particles in the dispersion must be kept below 20% by weight.

German Laid-Open Application DOS No. 2,529,427 discloses a process for the preparation of small capsules, wherein the wall material is based on urea and formaldehyde, with or without melamine. The process involves in situ condensation in an aqueous solution in the presence of a negatively charged polymeric polyelectrolyte having a linear aliphatic hydrocarbon skeleton with an average of 2 carboxyl groups per 4 carbon atoms of the hydrocarbon skeleton, the hydrocarbon skeleton being otherwise unsubstituted or possessing, on average, one methoxy group per 4 carbon atoms of the skeleton.

German Laid-Open Application DOS No. 2,757,528 describes the preparation of small polymer capsules, by polycondensing the condensable starting materials, such as melamine, methylolmelamine or methylated methylolmelamine, or low molecular weight prepolymers thereof, or mixtures thereof, in the presence of the above polymeric polyelectrolytes, to form the wall material.

The process for the production of small polymer capsules, disclosed in German Laid-Open Application DOS. No. 2,757,634, corresponds to the process disclosed in German Laid-Open Application DOS No. 2,529,427, with the difference that in the case of the later publication dimethylolurea or methylated dimethylolurea is used as the starting material for forming the wall material (compare claim 1).

Suitable negatively charged polymeric polyelectrolytes having a linear carbon skeleton, also referred to as system modifiers, for the processes described in German Laid-Open Applications DOS Nos. 2,529,427, 2,757,634 and 2,757,528 include ethylene/maleic anhydride copolymers, methyl vinyl ether/maleic anhydride copolymers, polyacrylic acid, propylene/maleic anhydride copolymers, butadiene/maleic anhydride copolymers and vinyl acetate/maleic anhydride copolymers with molecular weights of from 1,000 to 250,000.

According to German Laid-Open Application DOS. No. 2,757,528, the condensation at a relatively high pH of from 4.3 to 6 in the aqueous phase gives capsule dispersions containing more than 40% by volume of capsules. According to data in the descriptive section of the DOS, the dispersion contains capsules of from 1 to 100 μm, preferably from 1 to 50 μm, diameter, the individual capsules being substantially spherical. Furthermore, the viscosity of the capsule dispersion is stated to be less than 300 cps (=300 mPa.s), given an appropriate choice of the system modifier (ie. of the water-soluble negatively charged polymeric polyelectrolyte). However, none of the Examples gives information on the viscosity of the capsule dispersion obtained, or on the capsule size distribution.

When I repeated some of the Examples of German Laid-Open Application DOS No. 2,757,258, the emulsification of the core material being effected with a high-speed propeller stirrer, I obtained microcapsules having a particle size spectrum of from 1 to 180 μm; many of the capsules had diameters of from 3 to 25 μm, and bimodal diameter distributions were found. In addition, however, many capsules of from 3 to 1 Ξm diameter, and some of up to 180 μm diameter were found. According to the microphotographs, the capsule surface is not round and smooth but exhibits depressions and folds, and in part the microcapsules are of irregular shape. If the microcapsule dispersion obtained is applied to the CF side of a no-carbon paper, the paper is covered with numerous blue dots. Accordingly, such microcapsule dispersions are unsuitable for the production of no-carbon papers, since the papers are not clean, or do not remain clean. A further disadvantage of the capsule dispersions is that they contain some large capsules, which make the coated paper very sensitive to rubbing. Furthermore, the sharpness of the script charters, and hence the legibility of the copy, is very poor because of the effect of the numerous large capsules.

It is true that the larger capsules can be sieved out by means of a 25 μm mesh screen. However, this involves a substantial loss of microcapsules; the microcapsule dispersions obtained have a substantially lower capsule content than the starting dispersion. Furthermore, during sieving, the very brittle large capsules are, to a greater or lesser extent, destroyed on the screen, and consequently the dispersion is contaminated by exuded core material.

If the dispersion of the core material is carried out in a high-speed disperser or homogenizer, in order to obtain smaller capsules, the fine emulsion obtained sets after a few minutes. This gelling of the emulsion also occurs if polyelectrolytes of higher molecular weight are used, since in that case even the starting emulsion is very viscous and can no longer be mixed quite soon after the condensation has started. In view of this, German Laid-Open Application DOS No. 2,757,528 employs low molecular weight polymeric polyelectrolytes, such as are employed, for example, for dispersing pigments in the paper industry, so as to keep the viscosity of the capsule dispersions, of more than 40% strength by weight, at a low level.

In the prior art processes, the wall material is produced either by in situ polymerization from melamine and formaldehyde, or by condensation of melamine/-formaladehyde precondensates or of their ethers, the ratio of melamine to formaldehyde being, in every case, from about 1:1.5:1.3. The resulting products are highly reactive, ie. they condense rapidly to give products of higher molecular weight which, on dilution with water, or on introduction into the aqueous dispersion of the core material, precipitate (British Pat. No. 1,221,489). Since the precipitate is as a rule very coarse, this process does not give small and impermeable microcapsules which are suitable for pressure-sensitive recording materials.

It is an object of the present invention to provide a process by means of which it is possible to prepare impermeable microcapsules whose walls consist of melamine-formaldehyde condensates, and which are inter alia suitable for use in pressure-sensitive recording systems.

I have found that this object is achieved and that suitable microcapsules are obtained by condensing melamine-formaldehyde precondensate and/or their $C_1$–$C_4$-alkyl ethers in water in which the solid, liquid or gaseous substantially water-insoluble material forming the capsule core is dispersed, in the presence of dissolved polymers which contain negatively charged ionic groups, at a pH of from 3 to 6.5 and at from 20° to 100° C., if the polymer dissolved in the water is a homopolymer or copolymer which possesses sulfonic acid groups and is free from phenyl and sulfophenyl groups and has a K value, measured by the Fikentscher method, of from 100 to 170, or a viscosity of from 200 to 5,000 mPa.s at a shear gradient of 489 $s^{-1}$ (the viscosity being measured in 20% strength by weight aqueous solution at 25° C.) and if the melamine-formaldehyde precondensate is added continuously or in portions in step with the rate of condensation.

Using the novel process, microcapsule dispersions containing up to 60% by weight of microcapsules can be prepared. In addition, the dispersions contain the polymer, possessing sulfonic acid groups, in the form of a water-soluble salt. The microcapsules are individual capsules. Capsules with diameters of from 1 to 200 $\mu$m, or even larger, can be prepared by choosing suitable dispersing conditions. The very narrow size distribution of the capsules is a particular advantage. This is also true of the range of from 1 to about 8 $\mu$m, which is particularly suitable for the production of pressure-sensitive recording systems and of no-carbon papers. The capsules obtained by the novel process are exceptionally impermeable and contain the entire core material, for example the dye-forming component, in the encapsulates form. Hence, the capsules obtained by the process of the present invention are also suitable for the production of self-contained papers, in which the dye-forming component, in encapsulated form, and the electron acceptor required to form the dye are applied successively, or as a mixture, to the paper surface.

In spite of the high concentration of capsules and the high molecular weight of the water-soluble polymers containing sulfonic acid groups, the capsule dispersions are of very low viscosity and can therefore readily be filtered, even through screens of from 25 to 40 $\mu$m mesh. Filtration shows that the yield of microcapsules from the novel process is very high and in most cases exceeds 98%.

The viscosity of the microcapsule dispersion depends less on the solids content than on the conditions under which the polycondensation (polymerization) is carried out. The capsule dispersions obtained have a viscosity of from 100 to 400 mPa.s. In some cases, the viscosity can be lowered by employing a lower pH and higher temperature during the polycondensation, and under certain circumstances also during the final condensation stage.

If the core material of the capsules has a density of about 1, the capsule dispersions are very stable in spite of the low viscosity. Sedimentation of the microcapsules, especially through lengthy storage, can be prevented by adding crosslinked copolymers of acrylic acid (German Pat. No. 2,217,696).

The process according to the invention is in general carried out by emulsifying the core material, to be encapsulated, in an aqueous solution, of pH from 3 to 6.5, of the water-soluble polymer possessing sulfonic acid groups, to give fine droplets, the size of which can be adjusted to suit the envisaged end use. The aqueous solution of the melamine-formaldehyde precondensate and/or of its methyl ethers is added to this emulsion continuously or in portions, at the rate at which the condensation takes place, at from 20° to 100° C., with mixing. The rate of addition depends on the temperature and/or the pH of the aqueous emulsion. The higher the temperature, and the lower the pH in the emulsion, the more rapidly the precondensate can be added. When all has been added, the condensation is taken to completion. I have found that optimum condensation of the various precondensates requires somewhat different pH and temperature conditions, which can easily be determined by simple systematic experiments.

An essential feature of the process of the present invention is that the formation of the capsule walls takes place in the presence of the dissolved polymer, possessing sulfonic acid groups, as the polyelectrolyte. The polymer must have a Fikentscher K value of from 100 to 170 (measured in aqueous solution) or a viscosity of from 200 to 5,000 mPa.s at a shear gradient of 489 $s^{-1}$ (measured at 25° C., in 20% strength by weight aqueous solution, at a pH of from 4.0 to 7.0). Polymers which have a K value of from 115 to 160, or a viscosity of from 400 to 4,000 mPa.s, are preferred.

The higher the molecular weight or the K value of the water-soluble polymer used, the smaller are the capsules; the more slowly the condensation takes place at the instant of precipitation of the resin, the narrower is the particle size distribution of the capsules obtained. With the polymers, possessing sulfonic acid groups, used according to the invention, virtually no agglomeration of the microcapsules formed occurs. Agglomerates of microcapsules may form in the presence of these water-soluble polymers if the latter have been used in insufficient amounts; this adverse effect can be overcome by increasing the amount. Agglomerates may also form if too much polymer, or if a polymer of too high a molecular weight (ie. a K value greater than 170) is used. In such cases, the viscosity in the emulsion is so high that the dispersing device no longer produces adequate mixing of the batch and the latter therefore gels. It is true that gelling can be prevented if, for example, the batch is mixed by means of an additional stirrer, the rate of addition of the precondensate is reduced and/or the rate of condensation is reduced, the pH is increased and/or the temperature is reduced, but these measures do not give optimum results. Advantageously, the problem is overcome by using a different water-soluble polymer, having a lower molecular weight.

If on the other hand the water-soluble polymer, possessing sulfonic acid groups, has too low a K value, the stabilizing action of the polymer no longer suffices, even at relatively high concentration, so that the mixture coagulates or gels.

I have found, furthermore, that in the presence of polymers having a relatively high content of sulfonic acid groups the microcapsules obtained are somewhat more impermeable than those obtained in the presence of polymers having a lower content of such groups.

Examples of suitable water-soluble polymers possessing sulfonic acid groups include polymers of sulfoethyl acrylate or methacrylate, of sulfopropyl acrylate or methacrylate, of maleimide-N-ethanesulfonic acid or of 2-acrylamido-2-methylpropanesulfonic acid, either in the form of homopolymers of one of these monomers or as copolymers of mixtures of such monomers. Polymers of 2-acrylamido-2-methylpropanesulfonic acid are preferred, since the microcapsules formed in the presence of these have very good properties. 2-Acryloamido-2-methyl-propanesulfonic acid has the further advantage that it can easily be polymerized to give polymers having the desired K values. The polymers are in the form of the free acid or, preferably, in the form of the alkali metal salts. Further suitable polymers possessing sulfonic acid groups are copolymers of the above monomers possessing sulfonic acid groups with $C_1$–$C_3$-alkyl acrylates or hydroxy-$C_2$–$C_4$-alkyl acrylates, eg. methyl, ethyl, n-propyl or i-propyl acrylate or hydroxypropyl acrylate, and/or N-vinylpyrrolidone. In the case of copolymers of the acrylates, the proportion of the latter should not exceed 30% by weight. In the case of copolymers of the hydroxyalkyl acrylates, the proportion of the latter should not exceed 10% by weight, based on the sum of all comonomers. In the case of copolymers of N-vinylpyrrolidone, the proportion of monomers possessing sulfonic acid groups should be not less than 5% by weight and should preferably be 30% by weight or more (based on the sum of all comonomers). Amongst the copolymers, those in which 2-acrylamido-2-methylpropanesulfonic acid [$H_2C=CH-CO-NH-C(CH_3)_2-CH_2-SO_3H$] is the comonomer possessing sulfonic acid groups are preferred.

The homopolymers and copolymers possessing sulfonic acid groups are prepared by conventional methods.

The water-soluble polymers containing sulfonic acid groups are as a rule used in an amount of from 1 to 5.5, preferably from 1.5 to 4.5, % by weight, based on the aqueous phase. The optimum amount depends on the polymer itself, on the reaction temperature, on the desired microcapsule size and on the precondensate of melamine and formaldehyde, and can easily be determined by simple systematic experiments. I have found that the optimum concentration of the water-soluble polymer possessing sulfonic acid groups is virtually independent of the ratio of the aqueous continuous phase to the organic water-insoluble phase consisting of the core material. This means that once optimum conditions have been found, they can be used to produce microcapsule dispersions of various capsule contents, and yet the capsule quality will remain virtually constant.

A further advantage of the water-soluble polymers possessing sulfonic acid groups is that the sulfonic acid groups are completely dissociated at the pH in question and hence the solutions show no change in viscosity with change of pH.

Suitable starting materials for forming the capsule wall are melamine-formaldehyde precondensates and/or their methyl ethers, with a melamine:formaldehyde ratio of from 1:1.5 to 1:6, preferably from 1:3 to 1:6. Such precondensates are N-methylolmelamine compounds and their methyl ethers. The precondensates used for the process according to the invention must be miscible with water in all proportions without producing any clouding. For these reasons, methylolmelamine ethers are particularly preferred. The starting materials may be prepared by conventional methods. The final condensation of the precondensates is carried out at a pH of from 3.0 to 6.5, preferably from 3.8 to 5.5. Acids, preferably formic acid or, if the acidity is too great, sodium hydroxide solution, can be used to adjust the pH of the aqueous phase. The manner of precipitation of the melamine-formaldehyde condensate depends somewhat on the particular precondensate, so that the optimum pH and/or temperature for the formation of the microcapsules may differ somewhat for different precondensates.

Suitable core materials for the microcapsules include liquid, solid or gaseous materials which are insoluble, or substantially insoluble, in water, for example: liquids such as alkylnaphthalenes, partially hydrogenated terphenyls, aromatic benzene hydrocarbons, eg. xylene, toluene and dodecylbenzene, aliphatic hydrocarbons, eg. gasoline and mineral oil, chloroparaffins, fluorohydrocarbons, natural oils, eg. groundnut oil and soybean oil, adhesives, flavorings, perfume oils, monomers, eg. acrylic acid esters, methacrylic acid esters and styrenes, active ingredients, eg. crop protection agents, red phosphorus, inorganic and organic pigments, eg. iron oxide pigments, and solutions or suspensions of dyes, and especially of dye-forming components and pigments, in hydrocarbons such as alkylnaphthalenes, partially hydrogenated terphenyls, dodecylbenzene and other high-boiling liquids.

The dispersing of the core material is carried out in a conventional manner, in accordance with the size of the capsules to be produced. To produce large capsules, it suffices to carry out the dispersion process by means of efficient stirrers, especially propeller stirrers or impeller stirrers. Small capsules, especially of less than 50 μm, require homogenizers or dispersers, with or without a forced-flow mechanism.

The capsule size can be varied within certain limits by varying the speed of the disperser or homogenizer and/or by varying the concentration or molecular weight of the polymer possessing sulfonic acid groups, ie. varying the viscosity of the aqueous continuous phase. The size of the dispersed particles decreases with increasing speed of the dispersing equipment, up to a certain limiting speed. Equally, the droplet size and hence the size of the capsules as a rule decreases with increasing viscosity of the aqueous phase or with decreasing viscosity of the core material.

The composition of the polymers possessing sulfonic acid groups also has an effect on the particle size. Thus, in the presence of copolymers possessing sulfonic acid groups, the droplets of ethyl acrylate, methyl acrylate or hydroxypropyl acrylate obtained are smaller, and hence so are the capsules, than when using the corresponding homopolymers possessing sulfonic acid groups.

It is important that the dispersing equipment be used at the start of the capsule formation. In the case of continuous equipment with forced flow, it is advantageous to pass the emulsion repeatedly through the shearing zone. When the dispersed droplets are encapsulated by the wall material, the hardening of the capsules is advantageously carried out whilst stirring with normal stirrers such as anchor stirrers, propeller stirrers or impeller stirrers. Failing this, there is the danger that—especially in the case of large capsules, the capsules will be broken open in the shearing zone, because of the high shearing energy and that, because there is no longer any precondensate present, the holes in the capsules will no longer be closed. If this occurs, core material will be present on the outside of the capsules, and would for example, in the case of a solution of a dye-forming component, cause staining of the copy paper.

The capsule formation and capsule size can easily be monitored by inspection under the microscope. The oil droplets which have not yet been encapsulated rapidly coalesce under the cover slip on the slide. If the droplets prove stable, it means that a solid wall has already been deposited around them.

In the case of very fine droplets, the completion of wall formation is also recognizable from the fact that the emulsion, which on addition of the melamine-formaldehyde precondensate has become coarse and brown, again becomes fine and colorless. These changes can very easily be monitored by means of a turbidity-measuring probe.

Under optimum process conditions, capsule formation does not result in any transient thickening of the capsule dispersion.

The optimum conditions for each individual case, such as the temperature, pH, stirrer and rate of addition of the precondensate, can readily be determined by a few experiments.

The capsules obtained from the process still contain residual free formaldehyde, which can interfere with further processing. The residual formaldehyde can be bonded by adding, for example, from 10 to 100% by weight, based on precondensate used, of ethyleneurea and/or melamine, and keeping the mixture at from 20° to 100° C. and a pH of from 3 to 10. Advantageously, the removal of the formaldehyde is carried out immediately following the final condensation, ie., hardening.

The Examples which follow illustrate the process according to the invention. Parts and percentages are by weight, and the percentages are based on weight of the solution or dispersion. The solids contents referred to in the Examples include the microcapsules plus the water-soluble polymer.

The viscosity of the capsule dispersions was measured by means of a Brookfield viscometer and the viscosity of the solutions of the water-soluble polymers containing sulfonic acid groups was measured on 20% strength by weight aqueous solutions at 25° C. in a ®Rheomat 30 at a shear gradient of 489 s$^{-1}$. The K value was determined by the method of Fikentscher (Cellulosechemie 13 (1932), 58 et seq) on 1% strength solutions in water. The data concerning sieve retention and concerning wall crusts relate, unless stated otherwise, to dry retained material and to dry crust, respectively.

The microcapsules obtained as described in the Examples were tested in the following manner for impermeability and, where required, for intensity of the copy produced.

I. Test for impermeability and intensity of the copy

The microcapsule dispersion was diluted with water to 16.5% strength and coated, using a wire doctor, (α) onto ordinary typewriting paper and (β) onto a sheet coated with active clay (CF sheet) of a no-carbon paper, and the papers were dried. The amount applied was 5 g of microcapsules/m$^2$ of paper area.

In the case of microcapsule dispersions which contained particles larger than 10 μm, the dispersion was applied by means of a fine paintbrush.

(a) Test for impermeability

The microcapsules applied to the CF sheet according to (β) produce, after drying, a more or less slight staining of the clay coating on the paper, due to non-encapsulated dye-forming component. This external dye-forming component can be directly converted to the dye on the CF sheet by, for example, spraying the capsule-coated paper with dodecylbenzene and drying it. The coloration of the CF sheets treated in this way was measured as the difference of the reflectance of the non-sprayed and of the sprayed sheet, in a reflectometer (®Elrepho from Zeiss) and was recorded in relative % units, the reflectance of the non-sprayed sheet being taken as 100. The measured coloration is referred to as the ICF and is stated in %.

(b) Intensity of the copy

The coated sheet from (α) was placed with the coated side downward on a CF sheet, and 7 layers of paper of about 38 g/m$^2$ were then placed on top. This stack was put into an electric typewriter and an area of size 4.2 × 3.4 cm was typed, at the maximum typing pressure setting, with the letter w, the letters in a line being in immediate succession and the successive lines being arranged in close spacing. The intensity (IC) of the eighth copy obtained was measured as the difference in the reflectance of the CF sheet with and without typescript in a reflectometer (®Elrepho from Zeiss) and recorded in relative units in %, the reflectance of the blank sheet being taken as 100.

EXAMPLE 1

1.1 908 g of water and 200 g of a 20% strength solution of the sodium salt of a poly-2-acrylamido-2-methylpropionic acid (viscosity: 770 mPa.s, K value: 123) are mixed in a cylindrical 4 liter stirred vessel possessing a built-in disperser (®Turrax 45 N from Jahnke & Kunkel). The mixture, which constitutes the continuous aqueous phase, is brought to pH 4.5 and heated to 60° C. 800 g of partially hydrogenated terphenyl, in which 28.5 g of crystal violet lactone and 9.5 g of N-benzoyl-leucomethylene blue have been dissolved, are then dispersed in the aqueous solution, the speed of revolution being 8,000 rpm. A solution, brought to pH 4.5, of 120 g of a partially methylated precondensate of 1 mole of melamine and 5.25 moles of formaldehyde (the precondensate containing about 2.3 CH$_3$O groups per melamine molecule and giving a clear solution in water) in 132 g of water is then added at a uniform rate, over 60 minutes, at 60° C., to the stable, colorless dispersion obtained above. After about 30 minutes, it is found, by examining a sample under the microscope, that capsule formation has taken place, since the emulsion droplets no longer coalesce on the microscope slide. After a total of 65 minutes, the microcapsule dispersion obtained is subjected to a further 3.5 hours stirring at 60° C., this time with a propeller stirrer running at 500 rpm. The dispersion is then cooled, brought to pH 7.0 and sieved through a 40 μm mesh screen, on which about 0.7 g of solid residue remains. After as little as 120 minutes (from the start of the addition of the precondensate), the capsules have already hardened sufficiently that a sample coating of the dispersion on a thin layer chromatography plate coated with silica gel no longer gives a blue coloration after drying.

The dispersion obtained is colorless and milky and, according to examination under the microscope, contains individual capsules of predominantly from 2 to 5 μm diameter. Measured in the Coulter TF Counter, the particle size distribution maximum (numerical average) is at 3.5 μm, with a half-width value of from 1.5 to 5 μm. The maximum particle diameter is 8 μm. The viscosity is 140 mPa.s (measured in a Brookfield viscometer). The solids content is 42.8%. The dispersion smells of formaldehyde.

The microcapsules obtained were tested, by the methods described in I, for impermeability and intensity of copy. The impermeability test, according to (Ia), gave a ICF value of 0%, and the intensity test, according to (Ib), an IC value of 52%.

1.2 A microcapsule dispersion is prepared as described in 1.1. It is brought to pH 7, 21.6 g of ethyleneurea in 25 g of water are added, and the mixture is stirred slowly at room temperature for 24 hours, after which the formaldehyde odor has disappeared. The dispersion has virtually the same technological properties as the dispersion obtained as described in 1.1:

| Screen retention: | 0.8 g |
| Capsule diameter: | 2–5 μm |
| Viscosity: | 113 mPa.s |
| IC value according to (Ib): | 54% |
| ICF value according to (Ia): | 0% |

1.3 A microcapsule dispersion is prepared as described in 1.1. A suspension of 96.3 g of melamine in 120 g of water is added to the dispersion, at 60° C. and pH 4.5, with vigorous mixing. After 30 minutes, the formaldehyde odor has disappeared. The dispersion is cooled, neutralized and sieved.

| Screen retention: | 1 g |
| Capsule diameter: | 2–5 μm |
| Viscosity | 123 mPa.s |
| IC value according to (Ib): | 38% |
| ICF value according to (Ia): | 0%. |

The lower IC value compared to 1.1 and 1.2 is due to the thickening of the capsule wall resulting from the additional amount of melamine.

EXAMPLE 2

The method described in Example 1 is followed, but the pH in the aqueous emulsion and in the solution of the melamine-formaldehyde precondensate is brought to 4.0 and the solution of the latter is added to the emulsion at a uniform rate over 30 minutes. After 14 minutes, the droplets are already encapsulated by a wall. 5 minutes after completion of the addition of the precondensate, the stirring of the dispersion is continued by means of a propeller stirrer only. After only 60 minutes from the start of the addition of the precondensate, the microcapsule dispersion no longer stains silica gel. After a total of 4 hours, the dispersion is cooled to room temperature and sieved through a 40 μm mesh screen, which retains 0.7 g of material. Solids content of the dispersion: 42.4%.

The dispersion obtained is milky and has a viscosity of 164 mPa.s. The individual microcapsules in the dispersion are in the main of from 2 to 4 μm diameter. In the Coulter TF Counter, the maximum of the particle size distribution is found to be 3 μm, with a half-width value of from 1.2 to 4.9 μm. A test on paper according to (Ib) gives an IC value of 48% and a test according to (Ia) an ICF value of 0%.

EXAMPLE 3

The procedure described in Example 1 is followed, but the aqueous solution and the solution of the precondensate are brought to pH 5.0. The melamineformaldehyde precondensate is added to the emulsion over 105 minutes. Thereafter, stirring of the dispersion is continued with a propeller stirrer, at 60° C.

Capsule formation is found to have taken place 65–75 minutes after the start of the addition of the precondensate. A sample of the capsule dispersion taken 300 minutes after the start of the addition still produces a blue coloration on silica gel. The pH in the dispersion is lowered to 4.0 and the dispersion is heated at 80° C. After 1 hour, the capsules are perfectly impermeable. The dispersion is cooled, neutralized and sieved through a 40 μm screen (1.2 g screen retention). Solids content of the dispersion: 42.5%.

The dispersion obtained is milky and has a viscosity of 212 mPa.s. The diameter of the microcapsules is essentially from 2 to 4 μm. No capsule agglomerates are present. In the Coulter TF Counter the maximum of the particle size distribution is found to be 3.5 μm, with a half-width value of from 2.0 to 4.6 μm. A test on paper according to (Ib) gives an IC value of 48% and a test according to (Ia) an ICF value of 0%.

EXAMPLE 4

The procedure described in Example 1 is followed, but the following mixtures are used as the continuous aqueous phase:

4.1 300 g of a 20% strength solution of the sodium salt of a poly-2-acrylamido-2-methyl-propanesulfonic acid (viscosity 770 mPa.s; K value: 123) and 970 g of water;

4.2 120 g of a 20% strength solution of the sodium salt of a poly-2-acrylamido-2-methyl-propanesulfonic acid (viscosity 930 mPa.s; K value: 126) and 970 g of water;

4.3 60 g of a 20% strength solution of the sodium salt of a poly-2-acrylamido-2-methyl-propanesulfonic acid (viscosity 930 mPa.s; K value: 126) and 764 g of water. The characteristics of the microcapsule dispersions obtained are shown in the Table below:

| Example | 4.1 | 4.2 | 4.3 |
| --- | --- | --- | --- |
| Solids content [%] | 43.8 | 42.0 | 46.9 |
| Viscosity [mPa.s] | 440 | 158 | 40 |
| Screen retention [g] | 3.0 | 0.8 | 0.7 |
| Capsule diameter[1] [μm] | 2–5 | 2–4 | 3–7 |
| Capsule diameter distribution maximum[2] [μm] | 2.8 | 2.0 | 4.8 |
| IC value according to (Ib) [%] | 45 | 48 | 48 |

-continued

| Example | 4.1 | 4.2 | 4.3 |
|---|---|---|---|
| ICF value according to (Ia) [%] | 0 | 0 | 1 |

[1] Measured under the microscope
[2] Determined by means of the Coulter TF Counter

EXAMPLE 5

The procedure described in Example 1 is followed, but the following mixtures are used as the continuous aqueous phase:

5.1 200 g of a 20% strength solution of the sodium salt of a poly-2-acrylamido-2-methyl-propanesulfonic acid (viscosity 424 mPa.s; K value: 114) and 908 g of water;

5.2 120 g of a 20% strength solution of the sodium salt of a poly-2-acrylamido-2-methyl-propanesulfonic acid (viscosity 2200 mPa.s; K value: 160) and 927 g of water.

In Example 5.2, the core material is dispersed at 10,000 rpm. The characteristics of the microcapsule dispersions obtained are shown in the Table below:

| Example | 5.1 | 5.2 |
|---|---|---|
| Solids content [%] | 42.0 | 42.6 |
| Viscosity [mPa.s] | 131 | 596 |
| Screen retention [g] | 5 | 0.7 |
| Average capsule diameter[1] [μm] | 3–6 | 1–2 |
| Capsule diameter distribution maximum[2] [μm] | 4.6 | 2.4 |
| IC value according to (Ib) [%] | 46 | 50 |
| ICF value according to (Ia) [%] | 0 | 3 |

[1] Measured under the microscope
[2] Determined by means of the Coulter TF Counter

EXAMPLE 6

120 g of a 20% strength solution of the sodium salt of a poly-2-acrylamido-2-methyl-propanesulfonic acid (viscosity 930 mPa.s; K value: 126) and 650 g of water are introduced into the apparatus described in Example 1, the pH is brought to 4.5 with formic acid and the mixture is heated to 60° C. A solution of 9.3 g of 3'-phenyl-7-N-dimethylspirodibenzopyran, 22.65 g of 2,6-diphenyl-4-(4'-dimethylaminophenyl)-pyridine, 9.35 g of 3-dibutylamino-5-diethylamino-2,4-diazarhodamine-lactone, 6.13 g of N-benzoyl-leuco-methylene blue and 0.40 g of crystal violet lactone in 749.53 g of dodecylbenzene is then emulsified in the aqueous solution at 8000 rpm. With the stirrer continuing to run at the same speed, a solution, brought to pH 4.5, of 120 g of a partially methylated precondensate (containing about 2.3 $CH_3O$ groups per melamine molecule) of 1 mole of melamine and 5.25 moles of formaldehyde in 132 g of water is run uniformly over 60 minutes, at 60° C., into the above emulsion. 5 minutes after completion of the addition, the high-speed stirrer is switched off, and the microcapsule dispersion is then stirred for a further 4.5 hours, at 60° C., using a propeller stirrer at 500 rpm. The dispersion is then cooled, neutralized and sieved (40 μm mesh size, 0.8 g screen retention). Solids content of the dispersion: 49.6%.

Within 40 minutes after the end of the addition of the precondensate, a diluted sample no longer produces a coloration on silica gel.

The colorless microcapsule dispersion has a viscosity of 355 mPa.s. The capsules have a diameter of from 2 to 5 μm. A test according to (Ib) on paper gives a black copy having an IC value of 52%; the ICF value is 3%.

EXAMPLE 7

The apparatus described in Example 1 is used. 940 g of water and 160 g of a 20% strength solution of the sodium salt of a poly-2-acrylamido-2-methylpropanesulfonic acid (viscosity 880 mPa.s; K value: 129) are introduced, heated to 60° C. and brought to pH 4.5 with formic acid. A solution of 28 g of 3'-methyl-7-morpholinyl-2,2'-spiro-di-(2Hl-benzopyran) in 772 g of partially hydrogenated terphenyl is then emulsified in the aqueous phase. A solution of 120.4 g of a precondensate of 1 mole of melamine and 3.9 moles of formaldehyde, partially etherified with methanol to give about 2.4 $CH_3O$ groups per melamine molecule (this product being miscible with water in all proportions), in 132 g of water, is brought to pH 4.5 and introduced into the above emulsion over 60 minutes at 60° C. 5 minutes after completion of the addition, stirring of the dispersion is continued at 60° C. for 4 hours using a propeller stirrer (500 rpm), during which time hardening takes place. After cooling, sieving (about 8 g retention) and neutralizing, a 42.8% strength capsule dispersion is obtained, which has a viscosity of 34 mPa.s and contains capsules of diameter from 3 to 6 μm.

A test on paper as described in (Ib) gives an intense blue copy having an IC value, of the eighth copy, of 60%, and a test according to (Ia) gives an ICF value of 1%.

EXAMPLE 8

The procedure described in Example 7 is employed, but with the following changes:

(1) the pH in the aqueous continuous phase and in the solution of the precondensate is brought to 5.0;

(2) the condensation is carried out at 80° C. and (3) the amount of precondensate is increased to 361 g, the amount of water is increased to 235 g, and the latter is added to the emulsion over one hour.

An aqueous dispersion having a viscosity of 92 mPa.s and a solids content of 44.7% (screen retention 0.7 g) is obtained. The capsules have a diameter of from 2 to 12 μm. The test according to (Ib) gives a blue copy with an IC value of 40%, and the test according to (Ia) an ICF value of 1%. The IC value is lower than in the case of the capsules obtained according to Examples 1 to 7 since the capsules of Example 8 have a thicker wall and are therefore more difficult to destroy.

EXAMPLE 9

The procedure described in Example 1 is adopted, but with the following changes:

(1) the aqueous continuous phase used is a mixture of 160 g of a 20% strength solution of the sodium salt of a poly-2-acrylamido-2-methyl-propanesulfonic acid (K value: 129; viscosity 880 mPa.s) and 940 g of water, (2) the water-soluble precondensate used consists of 118.8 g of a condensate of melamine and formaldehyde in the ratio of 1:6, partially etherified with methanol (and containing about 4 $CH_3O$ groups per melamine molecule), in the form of an aqueous solution which has beforehand been brought to pH 4.5, and (3) the dispersion of the core material is effected at 10,000 rpm.

After cooling, neutralizing and sieving (about 0.8 g screen retention), a 42.7% strength capsule dispersion having a viscosity of 199 mPa.s, and containing capsules of diameter from 2 to 5 μm, is obtained.

A test on paper according to (Ib) gives a blue copy having an IC value of 54%, and a test according to (Ia) gives an ICF value of 1%.

EXAMPLE 10

The procedure described in Example 1 is adopted, but with the following changes:

(1) the aqueous continuous phase contains the same amount as in Example 1 of the sodium salt of a poly-2-acrylamido-2-methyl-propanesulfonic acid, but with a viscosity of 800 mPa.s and a K value of 129, (2) the condensation is carried out at pH 5.5 and (3) the reaction temperature is 90° C.

After cooling, neutralizing and sieving on a 40 μm mesh screen (0.7 g retention), a 45.5% strength capsule dispersion having a viscosity of 507 mPa.s is obtained. The capsules have a diameter of from 3 to 8 μm, and a small number of capsule twins and triplets are found to be present.

On paper, a test according to (Ib) gives an IC value of 51% and according to (Ia) an ICF value of 1%.

EXAMPLE 11

The procedure described in Example 1 is adopted, but with the following changes:

(1) the aqueous continuous phase is obtained by mixing 630 g of water with 200 g of a 20% strength solution of the sodium salt of a poly-2-acrylamido-2-methyl-propanesulfonic acid, which has a K value of 129 and a viscosity of 880 mPa.s, (2) the pH is brought to 5.0 and (3) the temperature is kept at 80° C.

The capsule dispersion obtained, after neutralizing and sieving (about 0.8 g screen retention), has a solids content of 54.3% and a viscosity of 540 mPa.s. On paper, a test according to (Ib) gives an IC value of 52% and according to (Ia) an ICF value of 0%.

EXAMPLE 12

The apparatus described in Example 1 is used. 120 g of the solution, described in Example 1, of the sodium salt of a poly-2-acrylamido-2-methylpropanesulfonic acid and 940 g of water are mixed in the stirring vessel, and brought to pH 5.0, and 800 g of the solution, described in Example 1, of the dye-forming component are emulsified in the above solution at 80° C. Next, a solution which contains 40.6 g of a partially methylated melamine-formaldehyde condensate (molar ratio 1:3.9, ≈2.4 $CH_3O$ groups per melamine molecule) in 97.4 g of water is added over 60 minutes. 5 minutes after completion of the addition, stirring is continued merely with a propeller stirrer (500 rpm), at 80° C. After 25 minutes, a further 241 g of the above precondensate in 183 g of water are added continuously over one hour. The capsules are hardened by stirring for 3 hours at 80° C. The dispersion is cooled, neutralized, and sieved through a 40 μm screen (5 g retention). Solids content of the dispersion: 42.8%.

The dispersion has a viscosity of 106 mPa.s and contains capsules having a diameter of from 3 to 7 μm, with very few agglomerates. The proportion of wall material in the capsules is about 26%. On paper, a test according to (Ib) gives an IC value of 43% and according to (Ia) an ICF value of 0%. The present Example, since they have a thicker wall and are therefore more difficult to destroy.

EXAMPLE 13

The procedure described in Example 12 is followed, but with the following changes:

(1) the condensation is carried out at 60° C. and pH 4.5, and (2) the precondensate used is a partially methylated reaction product of melamine and formaldehyde (1:5.2 molar ratio; ≈2.3 $CH_3O$ groups per melamine molecule).

A microcapsule dispersion having a viscosity of 127 mPa.s and a solids content of 42.9% is obtained. The diameter of the individual capsules is from 2 to 3 μm. On paper, a test according to (Ib) gives an IC value of 32% and according to (Ia) an ICF value of 0%.

If the total amount of precondensate is added over one hour, as in Example 1, a 44.7% strength dispersion having a viscosity of 167 mPa.s is obtained. On sieving through a 40 μm mesh screen, the retention is higher (12 g). The size of the capsules is from 3 to 6 μm.

The dispersion contains a few agglomerates. On paper, a test according to (Ib) gives an IC value of 38% and according to (Ia) an ICF value of 1%. The lower IC value is due to the thicker wall, as a result of which the capsules are more difficult to destroy.

EXAMPLE 14

The procedure described in Example 13 is followed, but the partially methylated precondensate, used in the same amount, is a condensation product of melamine and formaldehyde in the molar ratio of 1:6, with ≈4 $CH_3O$ groups per melamine molecule. The microcapsule dispersion has a solids content of 43.8% and a viscosity of 247 mPa.s, and contains individual capsules of from 2 to 3 μm diameter. On paper, a test according to (Ib) gives an IC value of 45% and according to (Ia) an ICF value of 0%.

The precondensate can also be added continuously over 1 hour. In that case a capsule dispersion having a solids content of 44.7% and a viscosity of 392 mPa.s is obtained. The dispersion contains individual capsules of from 1 to 2 μm diameter. On paper, a test according to (Ib) gives an IC value of 32% and according to (Ia) an ICF value of 0%.

The lower IC value of the present microcapsules is, as in the case of the microcapsules of Examples 12 and 13, due to the thicker capsule walls; the capsules become more difficult to destroy.

EXAMPLE 15

The procedure described in Example 1 is followed, but using, as the continuous aqueous phase, one of the following:

(1) 160 g of a 20% strength solution of a copolymer of 60% of the sodium salt of 2-acrylamido-2-methyl-propanesulfonic acid and 40% of N-vinylpyrrolidone (K value: 164, viscosity 3,330 mPa.s) and 908 g of water.

(2) 160 g of a 20% strength solution of a copolymer of 40% of the sodium salt of 2-acrylamido-2-methyl-propanesulfonic acid and 60% of N-vinylpyrrolidone (K value: 157, viscosity 2,970 mPa.s) and 908 g of water.

(3) 160 g of a 20% strength solution of a copolymer of 20% of the sodium salt of 2-acrylamido-2-methyl-propanesulfonic acid and 80% of N-vinylpyrrolidone (K value: 144, viscosity 2,030 mPa.s) and 908 g of water.

(4) 160 g of a 20% strength solution of a copolymer of 90% of N-vinylpyrrolidone and 10% of the sodium salt of vinylsulfonic acid (K value: 108, viscosity 1,000 mPa.s) and 908 g of water.

The core material is emulsified at 10,000 rpm. The microcapsule dispersions obtained are characterized in the Table which follows:

| Example | 15.1 | 15.2 | 15.3 | 15.4 |
|---|---|---|---|---|
| Solids content [%] | 44 | 44.2 | 43.4 | 43.6 |
| Viscosity [mPa.s] | 676 | 427 | 217 | 261 |
| Screen retention[1] [g] | 0.8 | 0.8 | 4 | 2.4 |
| Capsule diameter[2] [μm] | 1–4 | 2–4 | 2–5 | 2–5 |
| IC value according to (Ib) [%] | 51 | 55 | 53 | 52 |
| ICF value according to (Ia) [%] | 0 | 0 | 1 | 1 |

[1] 40 μm mesh screen
[2] determined under the microscope

If the procedure described above is followed, but instead of the above copolymers a homopolymer of N-vinylpyrrolidone (K value: 90, viscosity 2,180 mPa.s) is used, the condensate flocculates after 60 minutes and the mixture can no longer be dispersed.

EXAMPLE 16

The procedure described in Example 1 is followed, but the continuous aqueous phase used is a mixture of 908 g of water and 160 g of a 20% strength aqueous solution of the sodium salt of a poly-2-acrylamido-2-methylpropanesulfonic acid (K value: 129, viscosity 880 mPa.s), and 400 g of the core material (solution of dye-forming component) described in Example 1 are dispersed therein. The precondensate used is a solution of 360 g of a partially methylated hexamethylolmelamine (melamine:formaldehyde = 1:6, ≈4 $CH_3O$ groups per melamine molecule) in 160 g of water. After the addition of the precondensate, the microcapsules are hardened for 5 hours at 60° C. Only 25 minutes after completion of the addition of the precondensate, a sample of the dispersion no longer gives a blue color on silica gel.

After cooling, neutralizing and sieving (2.4 g screen retention), a dispersion containing 35.0% of solids and having a viscosity of 114 mPa.s is obtained. The capsules have a diameter of from 2 to 4 μm, with a few agglomerates.

On paper, a test according to (Ib) gives an IC value of 9% and according to (Ia) an ICF value of 1%, because of the high proportion of wall material, namely 36% based on the capsules.

EXAMPLE 17

This Example is intended to show what concentrations of microcapsule dispersions can be prepared by the process according to the invention.

The apparatus described in Example 1 is used. The continuous aqueous phase, containing, in solution, the amounts shown in Table I of the sodium salt of a poly-2-acrylamido-2-methyl-propanesulfonic acid described in Example 1, is introduced into the stirred vessel, the pH is brought to 4.5 and the solution is heated to 60° C. The amount shown in Table I of the core material (solution of dye-forming component) described in Example 1 is then emulsified in the aqueous phase with the high-speed stirrer running at 8,000 rpm, and the amount of precondensate shown in Table I is added, in the form of a solution which has been brought to pH 4.5, continuously to the above emulsion at 60° C. over 1 hour. The microcapsules obtained are then hardened at 60° C. for 3.5 hours whilst stirring the mixture with a propeller stirrer (500 rpm).

TABLE I

| Example | Continuous aqueous phase | | | Precondensate[2] | | Core material [g] |
|---|---|---|---|---|---|---|
| | Water [g] | Dissolved polymer[1] [g] = [%] | | [g] | Dissolved in water [g] | |
| 17.1 | 2027 | 62 | 3.0 | 60.2 | 66 | 400 |
| 17.2 | 2191 | 68 | 3.1 | 120.4 | 132 | 800 |
| 17.3 | 1068 | 40 | 3.6 | 120.4 | 132 | 800 |

[1] based on the aqueous phase
[2] partially methylated precondensate of melamine and formaldehyde (molar ratio 1:5.25)

17.4 The procedure followed is the general procedure described for Example 17, but with the following changes: the continuous aqueous phase used is a solution of 10 g (=1.8%) of the sodium salt of the above polymeric sulfonic acid in 540 g of water; the sulfonic acid as such would dissolve in water); the encapsulation is carried out at 70° C. and pH 4.0; the precondensate used consists of 132 g of a partially methylated melamine-formaldehyde precondensate (molar ratio of melamine:formaldehyde = 1:6; the product contains ≈4 $CH_3O$ groups per melamine molecule) in 58 g of water.

The microcapsule dispersions obtained according to 17.1, 17.2, 17.3 and 17.4 are characterized in Table II.

TABLE II

| Microcapsule dispersion from Example | Solids content [%] | Viscosity [mPa.s] | Diameter of the capsule [μm] | IC value according to (Ib) [%] | ICF value according to (Ia) [%] |
|---|---|---|---|---|---|
| 17.1 | 19.4 | 100 | 2–3 | 47 | 0 |
| 17.2 | 29.5 | 155 | 2–3 | 52 | 0 |
| 17.3 | 42.5 | 212 | 2–4 | 49 | 0 |
| 17.4 | 57.0 | 186 | 2–5 | 55 | 1 |

EXAMPLE 18

160 g of a 20% strength solution of the sodium salt of a poly-2-acrylamido-2-methyl-propanesulfonic acid (viscosity 770 mPa.s, K value: 129) and 940 g of water are introduced into a cylindrical glass vessel (4 liters capacity) which is equipped with a three-blade propeller stirrer and 3 low breaker plates at right angles to the vessel wall. The mixture is brought to pH 4.5 and heated to 60° C. 800 g of the core material solution described in Example 1 are then emulsified therein, and a solution of 120 g of a partially methylated melamine-formaldehyde precondensate (molar ratio 1:5.25; the product contains 2.3 $CH_3O$ groups per melamine molecule) in 132 g of water is added uniformly, over 1 hour, whilst stirring at 1500 rpm. After less than 70 minutes from the end of the addition of the precondensate, the capsules, when diluted with water, already give only a very slight blue coloration on a silica gel plate. After the addition of the precondensate, the capsules are hardened for 4 hours at 60° C. The batch is cooled and neutralized.

The dispersion obtained has a solids content of 41.7% and a viscosity of 220 mPa.s. The dispersion contains individual spherical microcapsules having a smooth surface and diameters ranging from 30 to 60 μm, ie. the diameter distribution is narrow. Some of the capsules show shallow recesses; smaller, and substantially larger, capsules are absent. Because of the large capsules, application of the dispersion to paper gives copy papers extremely sensitive to rubbing, which in turn give barely legible copies. The coating, (by means of a fine paintbrush) onto a CF acceptor surface, as described in (Ia), shows a white ground with only very isolated blue dots.

COMPARATIVE EXAMPLE 1

The procedure described in Example 1 is employed, but the following are used instead of the sodium salt of a poly-2-acrylamido-2-methyl-propanesulfonic acid.

1.1 40 g of a polyacrylic acid (K value: 132, viscosity 800 mPa.s).

1.2 26 g of the polyacrylic acid described under 1.1

1.3 40 g of a polyacrylic acid (K value: 162, viscosity 3,600 mPa.s).

The core material is emulsified at 7,500 rpm in the case of 1.1 and 1.3 and at 8,000 rpm in the case of 1.2. The microcapsule dispersions obtained are characterized in the Table which follows.

| Comparative Examples | 1.1 | 1.2 | 1.3 |
|---|---|---|---|
| Solids content [%] | 42.9 | 40.0 | 41.9 |
| Viscosity [mPa.s] | 49 | 30 | 3700 |
| Screen retention[1] [g] | 1.5 | 50 | 8[2] |
| Mean capsule diameter[3] [μm] | 3-6 some agglomerates | 2-18 numerous agglomerates | 1-4 some agglomerates |
| IC value according to (Ib) [%] | 54 | 54 | 44 |
| ICF value according to (Ia) [%] | 8 | 1 | 10 (ie. blue staining) |
| Intensity of script, and legibility | poor | poor | adequate |

[1] 40 μm mesh
[2] and 80 g of wall crust
[3] measured under the microscope

As may be seen from the result of the Comparative Experiments, the use of sodium polyacrylate instead of the sodium salt of a poly-2-acrylamido-2-methyl-propanesulfonic acid does not give microcapsules or capsule dispersions of equivalent quality.

COMPARATIVE EXAMPLE 2

The procedure described in Example 1 is followed, but:

(1) instead of the sodium salt of a poly-2-acrylamido-2-methyl-propanesulfonic acid, the same amount (40 g) of the sodium salt of a polyacrylic acid (K value: 131, viscosity 515 mPa.s) is used and (2) the melamine-formaldehyde precondensate is added as a single shot at the beginning.

20 minutes after the addition, the mixture begins to gel. A mixable suspension is obtained by adding 300 g of cold water.

The capsule dispersion obtained after hardening has a solids content of 35.6% and a viscosity of 30 mPa.s. The capsule diameters are from 1 to 3 μm; a proportion of the capsules is agglomerated. The screen retention (40 μm mesh) is 1 g. A test according to (Ib) gives an IC value of 44% and a test according to (Ia) in ICF value of 13%, i.e., a blue coloration is obtained on the CF coating.

COMPARATIVE EXAMPLE 3

The procedure described in Example 1 is followed, except that (1) the polymeric sulfonic acid used consists of 40 g of the sodium salt of a poly-2-acrylamido-2-methyl-propanesulfonic acid (K value: 134, viscosity 1095 mPa.s) and (2) the melamine-formaldehyde precondensate is added as a single shot at the beginning.

20 minutes after the addition of the precondensate, the dispersion begins to solidify. After a further 10 minutes, 300 g of water is added to enable mixing of the batch to continue. After hardening, cooling and sieving (screen retention 3 g), a capsule dispersion having a solids content of 35.6% and a viscosity of 127 mPa.s is obtained. The dispersion contains numerous capsule agglomerates. Diameter of the capsules: 1 to 4 μm.

On paper, a test according to (Ib) gives an IC value of 48% and according to (Ia) an ICF value of 1%. Because of the agglomerates, the dispersion gives copy papers which have increased sensitivity to rubbing.

COMPARATIVE EXAMPLE 4

The procedure described in Comparative Example 3 is followed, but 300 g of water are added immediately it has become impossible to mix the batch.

After sieving (screen retention: 10 g) a capsule dispersion having a solids content of 37.5% and a viscosity of 46 mPa.s is obtained. The dispersion contains individual capsules and no agglomerates. Capsule diameters from 2 to 5 μm.

On paper, a test according to (Ib) gives an IC value of 46% and according to (Ia) an ICF value of 1%.

COMPARATIVE EXAMPLE 5

(German Laid-Open Application DOS No. 2,757,528, Example 10)

360 g of the core material used in Example 1 are emulsified, in a cylindrical glass vessel (capacity 2 liters) having a propeller stirrer and 3 flow breakers attached to the glass wall (see Example 18), in a solution of 24 g of a polyacrylic acid (molecular weight about 21,800, determined from viscosity measurement; K value: 65; viscosity 38 mPa.s; the product approximately corresponds to the "Acrysol A-3" of Example 10 of the DOS) in 400 g of water and 80 g of a partially methylated melamine-formaldehyde precondensate (molar ratio 1:3.9; the product contains ≈2.4 CH$_3$O groups per melamine molecule) at pH 4.0, with the stirrer running at 1500 rpm. A waterbath at 40° C. is then placed around the vessel and is heated to 55° C. over 15 minutes. After 60 minutes at 55° C., capsule formation is complete. The dispersion is cooled and neutralized. About 4 g of residue are found on the stirrer and glass vessel.

On sieving through a 40 μm mesh screen, 20 g of material are retained, containing, inter alia, capsules of diameter up to 180 μm. The dispersion which has passed through the screen has a viscosity of 56 mPa.s and a solids content of 47.7%. When the dilute solution is applied to silica gel, a virtually colorless ground, with numerous blue spots, is obtained. The dispersion contains capsules of from 3 to 40 μm diameter, and clearly shows a bimodal distribution (2–6 and 12–24 μm). The capsules possess numerous recesses and wrinkles; this is particularly true of the capsules retained on the screen.

If the above batch is doubled and is emulsified in the apparatus described in Example 1, at 10,000 rpm, an emulsion which contains droplets of from 3 to 15 μm is obtained after a few minutes. On heating in a waterbath the emulsion coagulates when the temperature reaches 49° C. (10 minutes after the start of heating), and becomes solid, so that mixing is no longer possible.

COMPARATIVE EXAMPLE 6

(German Laid-Open Application DOS No. 2,757,528, Example 7)

A mixture of 32.7 g of an aqueous 35% strength solution of a 1:1 copolymer of vinyl methyl ether and maleic acid, 292 g of water and 42 g of the melamine-formaldehyde precondensate used in Comparative Example 5 is introduced into the apparatus also described in Comparative Example 5, and brought to pH 4.5. The vinyl methyl ether/maleic acid copolymer has a K value of 69 and the viscosity of a 20% strength solution is 138 mPa.s; the copolymer approximately corresponds to the commercial product ®Gantrez AN 119 mentioned in Example 7 of German Laid-Open Application DOS No. 2,757,528. 300 g of the core material (solution of dye-forming component) described in Example 1 are introduced into the aqueous solution whilst stirring at 1,500 rpm. The batch is then heated to 55° C. while stirring at the same speed. 30 minutes after reaching 55° C., capsules form. The batch is kept at 55° C. for a further 2.5 hours and is then cooled. The dispersion formed has a viscosity of 194 mPa.s and a solids contents of 49.7%. The particles are substantially agglomerated. Under the microscope, capsules of diameter from 1 to 3 μm and of from 10 to 30 μm diameter are discernible. Some of the capsules are of irregular shape. If a dilute sample of the dispersion is spread on silica gel, a blue coloration occurs. It is not possible to sieve the dispersion through a 40 μm mesh screen.

If the above batch is doubled and emulsified in the apparatus described in Example 1, at 10,000 rpm, a thick flocculated material forms in the emulsion 10 minutes after reaching 55° C., and the core material begins to accumulate on the surface as large drops of oil. A capsule dispersion which is useful for practical applications is not obtainable.

COMPARATIVE EXAMPLE 7

(German Laid-Open Application DOS No. 2,757,528, Example 4)

7.1 24 g of a polyacrylic acid (molecular weight 5,000, K value 35, viscosity of a 20% strength solution 13.4 mPa.s; the product corresponds to the commercial polyacrylic acid "Good-rite K-732" used in Example 4 of German Laid-Open Application DOS 2,757,528) in 580 g of water are introduced into the apparatus described in Comparative Example 5 and 400 g of the core material described in Example 1 are emulsified in this aqueous solution, while stirring at 1,500 rpm. The suspension is brought to pH 5.1 and heated to 55° C. At this temperature, 93.2 g of a clear solution which has been obtained by heating a mixture of 252 g of melamine and 324 g of aqueous 37% strength formaldehyde solution at pH 9.0 at 90° C. and has been stabilized by neutralizing to pH 7.3 with formic acid and been cooled (the solution is miscible with water in all proportions, without cloudiness), are then added to the suspension, at 55° C., over 2 minutes. The emulsion is stirred for 22 hours at pH 5.1 and the microcapsule dispersion thus obtained is neutralized and sieved. About 12 g of solid crust on the wall, and some non-encapsulated drops of oil, remain in the vessel. Screen retention: 44 g. Solids content of the sieved dispersion: 37.9%, viscosity 65 mPa.s. The particles have diameters of from 3 to 40 μm. The very small particles are agglomerated. If the dilute dispersion is applied to silica gel and dried, a deep blue coloration is obtained.

7.2 If experiment 7.1 is repeated with a polyacrylic acid of molecular weight 21,800 (K value 60), the emulsion becomes stiff after addition of the precondensate if, at 55° C., the pH is lowered from 6.1 to 5.5. Microcapsules are not obtained.

7.3 If the apparatus described in Example 1 is used, with twice the amounts employed in 7.1 above, the emulsion becomes solid, at pH 5.5, 5 minutes after addition of the precondensate.

7.4 If the procedure described in 7.3 is followed, but with the polyacrylic acid used in 7.2, the emulsion solidifies on merely bringing the pH from 6.1 to 5.5.

EXAMPLE 19

The procedure described in Example 1 is followed, but with the following polymers containing sulfonic acid groups:

19.1 40 g of a copolymer of 95 parts of the sodium salt of 2-acrylamido-2-methyl-propanesulfonic acid and 5 parts of hydroxypropyl acrylate (K value 132, viscosity of a 20% strength solution 681 mPa.s) in 160 g of water.

19.2 40 g of a copolymer of 80 parts of the sodium salt of 2-acrylamido-2-methyl-propanesulfonic acid and 20 parts of hydroxypropyl acrylate.

19.3 40 g of a copolymer of 80 parts of the sodium salt of 2-acrylamido-2-methyl-propanesulfonic acid and 20 parts of methyl acrylate (K value 130, viscosity 1,421 mPa.s).

19.4 40 g of a copolymer of 90 parts of the sodium salt of 2-acrylamido-2-methyl-propanesulfonic acid and 10 parts of ethyl acrylate (K value 142, viscosity 1,100 mPa.s).

In the case of 19.2, a very fine emulsion is produced, which froths 25 minutes after starting the addition of the precondensate, and then becomes stiff.

The microcapsule dispersions obtained according to 19.1, 19.3 and 19.4 are characterized in the Table which follows.

| Example | 19.1 | 19.3 | 19.4 |
| --- | --- | --- | --- |
| Solids content [%] | 42.2 | 41.8 | 42.5 |
| Viscosity [mPa.s] | 485 | 323 | 435 |
| Screen retention [g] | 1.2 | 4 | 1.2 |
| Capsule diameter [μm] | 1–3 | 1–3 | 1–3 |
| IC value according to (Ib) [%] | 45 | 45 | 47 |
| ICF value according to (Ia) [%] | 0 | 0 | 0 |

EXAMPLE 20

A microcapsule dispersion is prepared as described in Example 7, but instead of the solution of dye-forming component, 800 g of the fungicide N-tridecyl-2,6-dimethylmorpholine are dispersed, as the core material, in the aqueous phase at pH 5.

A capsule dispersion having a solids content of 42.8% is obtained, the capsules having diameters of from 2 to 5 μm. A sample of the dispersion is extracted with hexane and the N-tridecyl-2,6-dimethylmorpholine is determined in the extract. Less than 0.1% of the morpholine derivative employed is found, ie., the morpholine derivative is virtually completely encapsulated.

The encapsulation reduces the rate of evaporation of the fungicide from $259 \times 10^{-3}\%$. $h^{-1}$(non-encapsulated) to $1.62 \times 10^{-3}\%$. $h^{-1}$, thereby achieving an advantageous extension of the length of time over which the fungicide is active.

I claim:

1. An improved process for the preparation of microcapsules, wherein the microcapsules are prepared by condensing melamine-formaldehyde precondensates, their $C_1$–$C_4$-alkyl ethers, or mixtures thereof, in water in which the solid, liquid or gaseous substantially water-insoluble material forming the capsule core is dispersed, in the presence of a dissolved polymer which contains negatively charged ionic groups, at a pH of from 3 to 6.5 and at a temperature of from 20° to 100° C., the improvement being that the polymer dissolved in the water is a homopolymer or copolymer which possesses sulfonic acid groups and contains neither phenyl nor sulfophenyl groups and has a K value, measured by the Fikentscher method, of from 100 to 170 or a viscosity of from 200 to 5,000 mPa.s at a shear gradient of 489 s$^{-1}$ (the viscosity being measured in 20% strength by weight solution at 25° C.), said polymer being present at from 1.0 to 5.5% by weight based on the aqueous phase, and that the melamine-formaldehyde precondensate is added continuously or in portions in step with the rate of condensation.

2. A process as claimed in claim 1, wherein the water-soluble polymer possessing sulfonic acid groups is a homopolymer of sulfoethyl acrylate, sulfoethyl methacrylate, sulfopropyl acrylate, sulfopropyl methacrylate, maleimide-N-ethanesulfonic acid or 2-acrylamido-2-methyl-propanesulfonic acid or a copolymer of vinylsulfonic acid, sulfoethyl acrylate, sulfoethyl methacrylate, sulfopropyl acrylate, sulfopropyl methacrylate, maleimide-N-ethanesulfonic acid or 2-acrylamido-2-methyl-propanesulfonic acid or a mixture of one or more of these sulfonic acids with a $C_1$–$C_3$-alkyl acrylate, a hydroxy-$C_2$–$C_4$-alkyl acrylate or N-vinylpyrrolidone, the copolymers with the acrylic esters containing not less than 70% by weight, and the copolymers with N-vinylpyrrolidone containing not less than 5% by weight, in each case based on the copolymer, of comonomers, possessing sulfonic acid groups, as copolymerized units.

3. A process as claimed in claim 1, wherein the water-soluble polymer possessing sulfonic acid groups is a homopolymer of sulfoethyl acrylate, sulfoethyl methacrylate, sulfopropyl acrylate, sulfopropyl methacrylate, maleimide-N-ethanesulfonic acid or 2-acrylamido-2-methyl-propanesulfonic acid.

4. A process as claimed in claim 1, wherein the water-soluble polymer possessing sulfonic acid groups is a homopolymer of 2-acrylamido-2-methylpropanesulfonic acid.

5. A process as claimed in claim 1 or 2 or 3 or 4, wherein the copolymer possessing sulfonic acid groups has a Fikentscher K value of from 115 to 160 or a viscosity of from 400 to 4,000 mPa.s (measured in 20% strength by weight aqueous solution at 25° C.) at a shear gradient of 489 s$^{-1}$.

6. A process as claimed in claim 5, wherein the dispersion is mixed under shearing conditions until the microcapsules are formed, and is then carried in a conventional manner whilst the condensation (hardening) of the wall material is being completed.

7. A process as claimed in claim 1 or 2 or 3 or 4, wherein from 1.5 to 4.5% by weight, based on the aqueous phase, of the polymer possessing sulfonic acid groups are dissolved in the aqueous phase.

8. A process as claimed in claim 7, wherein the dispersion is mixed under shearing conditions until the microcapsules are formed, and is then stirred in a conventional manner whilst the condensation (hardening) of the wall material is being completed.

9. A process as claimed in claim 1 or 2 or 3 or 4, wherein the dispersion is mixed under shearing conditions until the microcapsules are formed, and is then stirred in a conventional manner whilst the condensation (hardening) of the wall material is being completed.

10. A process as claimed in claim 1 or 2 or 3 or 4, wherein, after completion of hardening, the excess formaldehyde in the capsule dispersion is removed by reaction with a substance which reacts either quantitatively or substantially quantitatively with formaldehyde, at pH 3–10 and at from 20° to 100° C.

11. A process as claimed in claim 10, wherein ethyleneurea, melamine or a mixture of these is used as the substance which binds formaldehyde.

12. Microcapsules prepared by the process of claim 1, 2, 3 or 4.

* * * * *